US008422217B2

(12) United States Patent
Xia et al.

(10) Patent No.: US 8,422,217 B2
(45) Date of Patent: Apr. 16, 2013

(54) HARD DISK DRIVE

(75) Inventors: Gao-Liang Xia, Shenzhen (CN);
Xin-Hu Gong, Shenzhen (CN);
Wen-Tang Peng, Taipei Hsien (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 224 days.

(21) Appl. No.: 12/878,963

(22) Filed: Sep. 9, 2010

(65) Prior Publication Data

US 2012/0033374 A1  Feb. 9, 2012

(30) Foreign Application Priority Data

Aug. 5, 2010 (CN) .......................... 2010 1 0246145

(51) Int. Cl.
*G06F 1/16* (2006.01)
(52) U.S. Cl.
USPC ............ 361/679.33; 361/679.32; 361/679.37; 361/679.39; 361/679.41; 361/679.58
(58) Field of Classification Search ............. 361/679.33, 361/679.32, 679.37, 679.39, 679.4, 679.41, 361/679.58, 692, 715, 785, 788, 796, 801
See application file for complete search history.

(56) References Cited

U.S. PATENT DOCUMENTS 5,822,184 A * 10/1998 Rabinovitz ............... 361/679.31
2011/0210220 A1 * 9/2011 Peng et al. ................. 248/311.2

* cited by examiner

*Primary Examiner* — Tuan T Dinh
*Assistant Examiner* — Hung Dang
(74) *Attorney, Agent, or Firm* — Altis Law Group, Inc.

(57) ABSTRACT

A hard disk drive includes a housing module configured to accommodate one of many different types of hard disk modules. Each hard disk module includes a number of connectors. The housing module includes a connecting board, and different types of connectors protruding from the connecting board, corresponding to the connectors of the different types of hard disk modules.

2 Claims, 4 Drawing Sheets

HARD DISK DRIVE

BACKGROUND

1. Technical Field

The disclosure relates to a hard disk drive.

2. Description of Related Art

A hard disk drive includes a housing module and a hard disk module mounted in the housing module. If the hard disk module needs to be replaced, a new housing module is needed to accommodate the new hard disk module, which increases the cost, and even wastes the old housing module.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
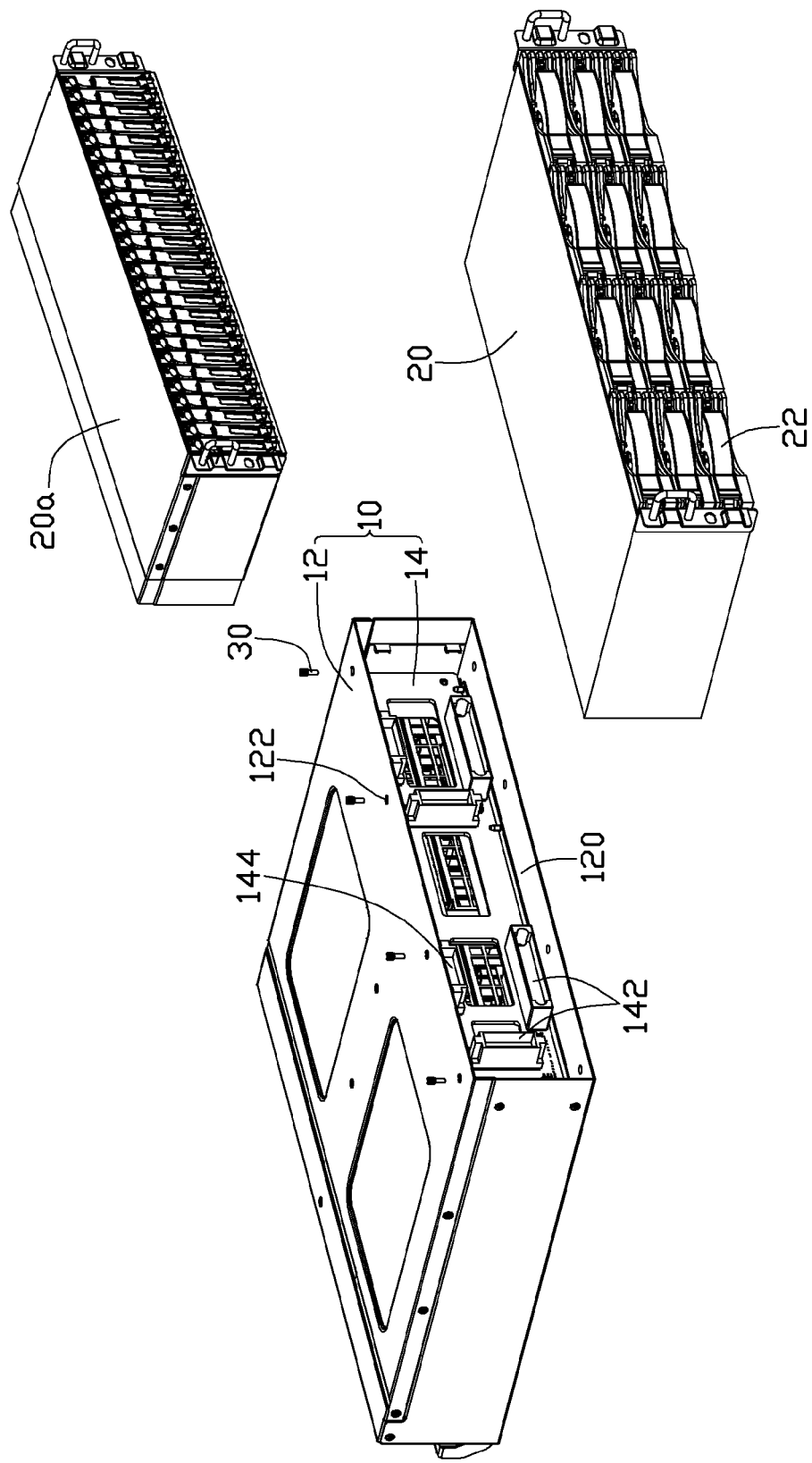
FIG. 1 is an exploded, isometric view of an exemplary embodiment of a hard disk drive; the hard disk drive includes a housing module, a first sized hard disk module, and a second sized hard disk module.
Figure 2:
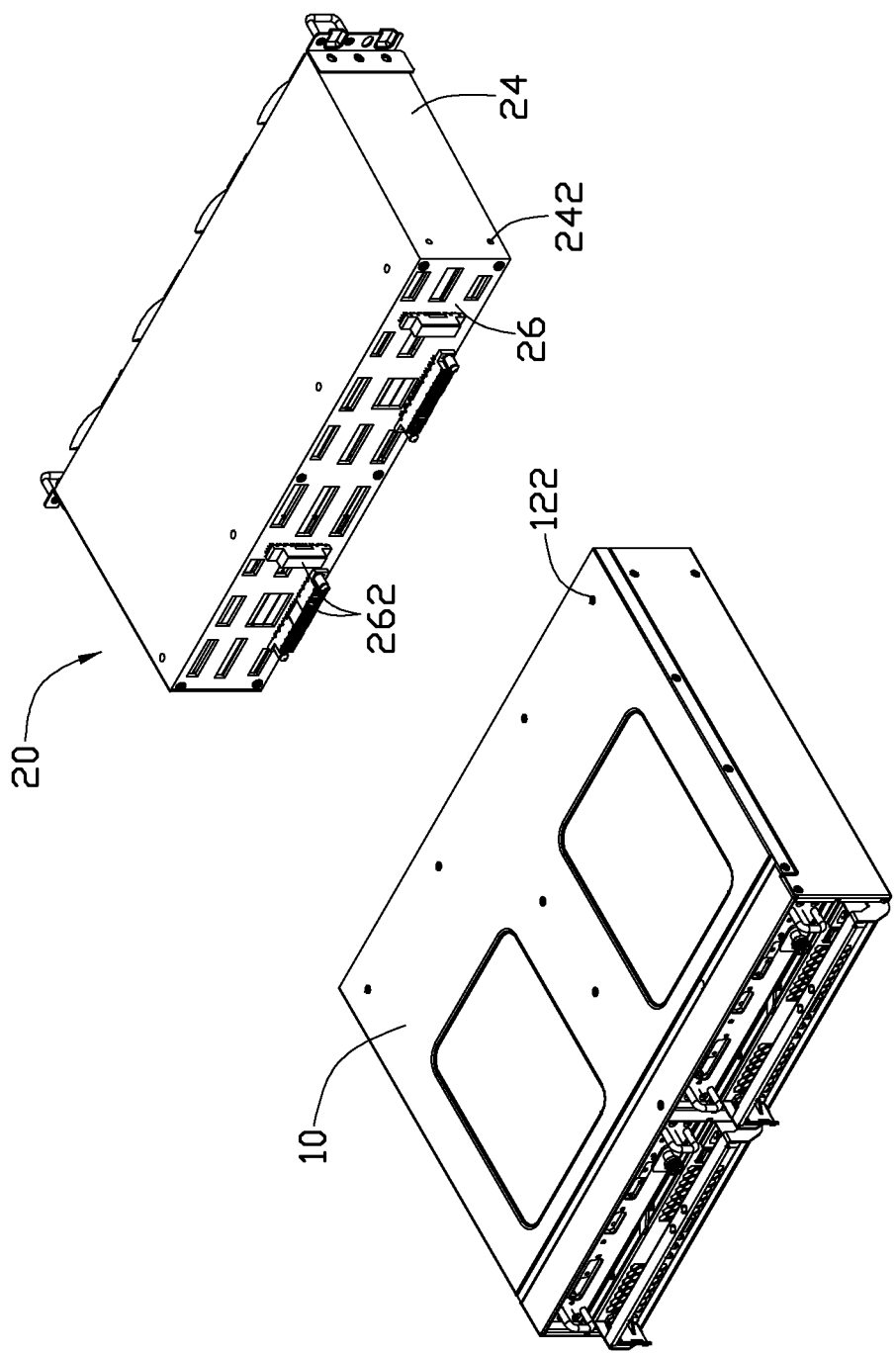
FIG. 2 is similar to FIG. 1, but viewed from another perspective and not showing the second sized hard disk module.

Referring to FIGS. 1 and 2, in an exemplary embodiment, a hard disk drive includes a housing module 10, and a 3.5-inch hard disk module 20 and a 2.5-inch hard disk module 20a selectively and detachably mounted to the housing module 10.

The housing module 10 includes a bracket 12, a connecting board 14 mounted in the bracket 12. The bracket 12 is divided into first and second receiving rooms by the connecting board 14. The first receiving room 120 which is located adjacent to the front side of the bracket 12 is smaller. Sidewalls of the first receiving room 120 define a number of through holes 122. The second receiving room (not labeled) which is located adjacent to the back side of the bracket 12 is larger, and configured to accommodate a power supply and other elements to execute the function of the hard disk drive.

Opposite ends of the connecting board 14 are mounted to opposite sides of the bracket 12. A set of first type of connectors 142 extend into the first receiving room 120 from the connecting board 14. A set of second type of connectors 144 extend into the first receiving room 120 from the connecting board 14.

The 3.5-inch hard disk module 20 includes a number of hard disk devices 22 and a cage 24 for receiving the hard disk devices 22. Sidewalls of the cage 24 define a number of fastening holes 242. A circuit board 26 is detachably mounted to the back side of the cage 24 and is electrically connected to the hard disk devices 22. A number of connectors 262, corresponding to the first type of connectors 142 of the housing module 10, protrude from the circuit board 26.

Similarly, the 2.5-inch hard disk module 20a includes a number of hard disk devices, a cage, and a circuit board having a number of connectors corresponding to the second type of connectors 144 of the housing module 10.

Figure 3:
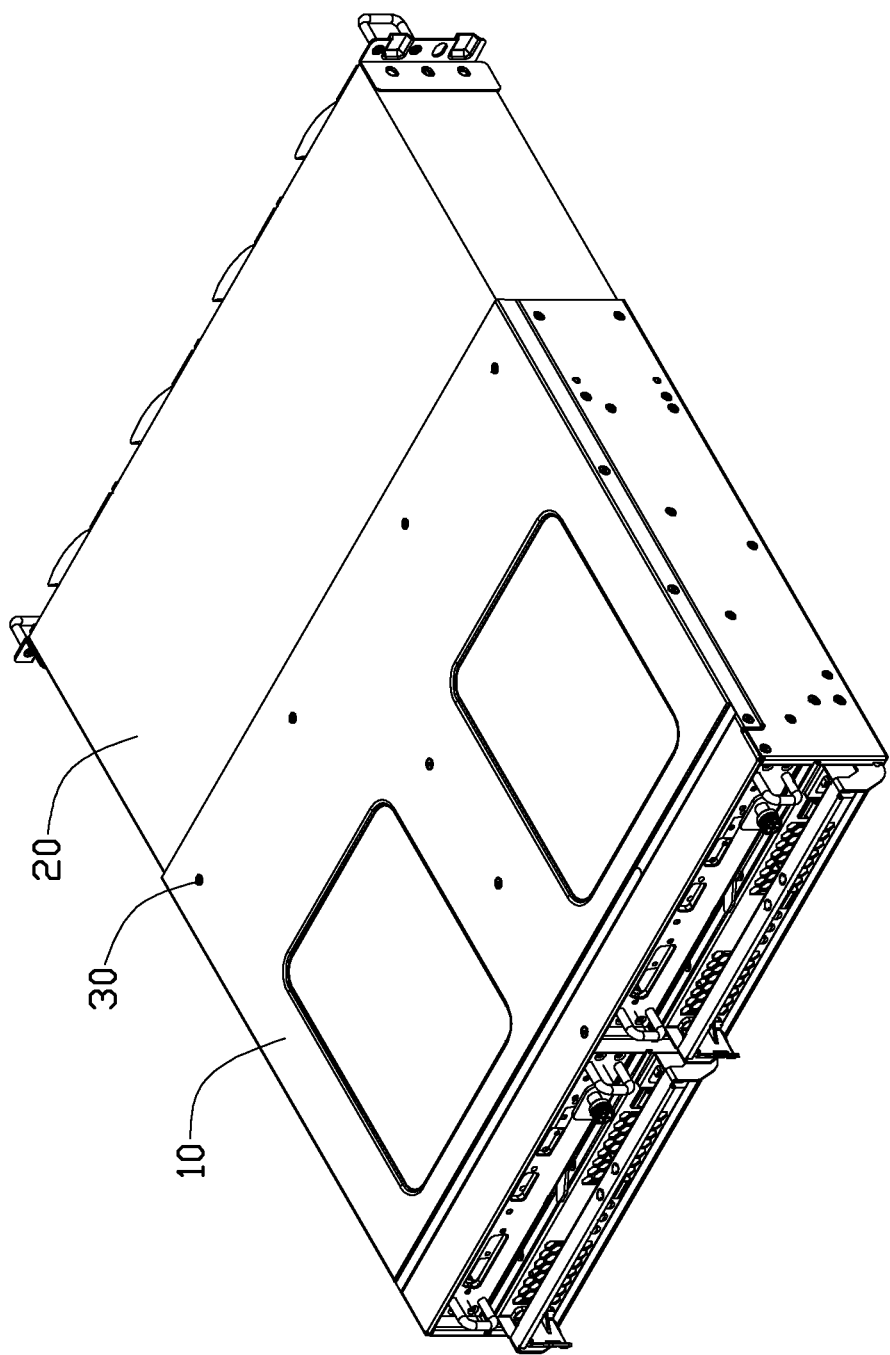
FIG. 3 is an assembled, isometric view of the housing module and the first sized hard disk module of FIG. 2.
Figure 4:
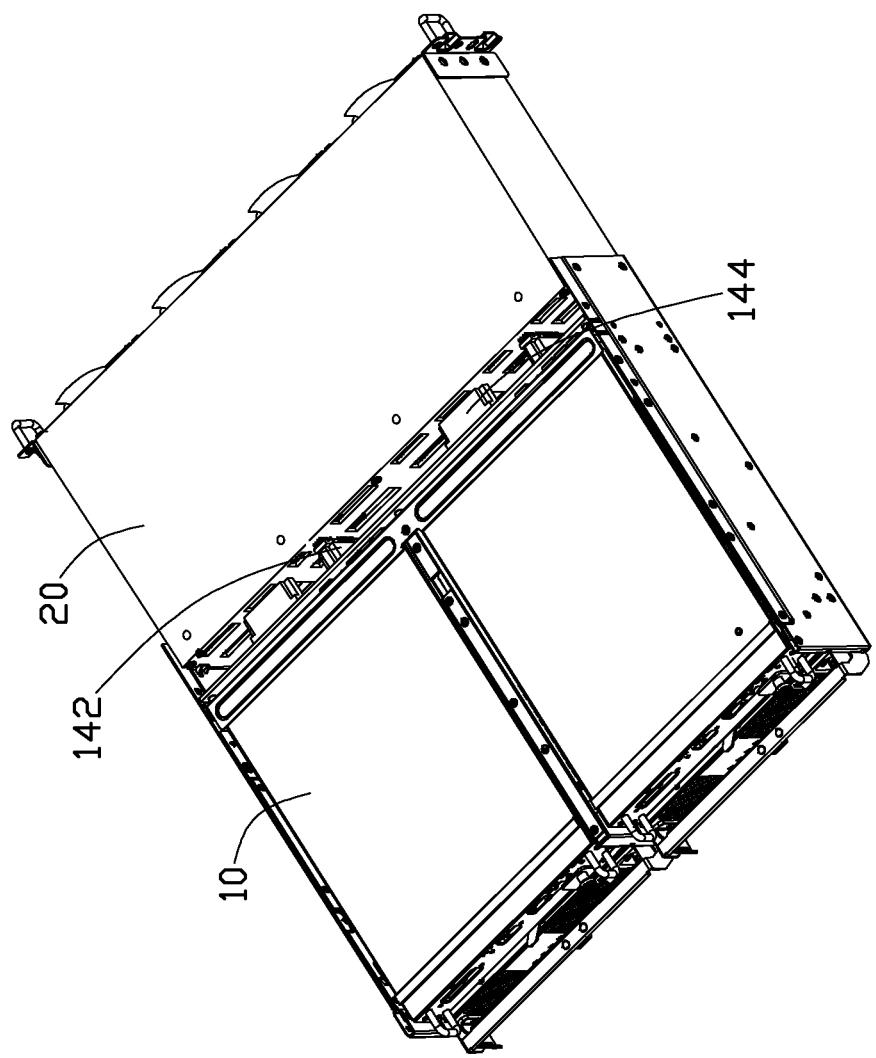
FIG. 4 is similar to FIG. 3, but showing a cover removed from the housing module.

Referring to FIGS. 3 and 4, in assembly, the 3.5-inch hard disk module 20 is inserted into the first receiving room 120 of the housing module 10 with the hard disk module 20 partially received in the first receiving room 120, and the through holes 122 in alignment with the fastening holes 242. A number of fasteners 30 extend through the through holes 122, and are engaged in the fastening holes 242, thereby, the 3.5-inch hard disk module 20 is mounted to the housing module 10. In this state, the first type of connectors 142 is connected to the connectors 262 of the 3.5-inch hard disk module 20, with the second type of connectors 144 abutting against the circuit board 26 of the 3.5-inch hard disk module 20. In this embodiment, the fasteners 30 are bolts.

In replacement of the 3.5-inch hard disk module 20 with the 2.5-inch hard disk module 20a, the fasteners 30 are released, then, the 3.5-inch hard disk module 20 is removed from the housing module 10. Thereafter, the 2.5-inch hard disk module 20a is mounted to the housing module 10, with the second type of connectors 144 of the housing module 10 connected to the connectors of the 2.5-inch hard disk module 20a, and the first type of connectors 142 abutting against the circuit board of the 2.5-inch hard disk module 20a.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. An assembly comprising:

a housing module comprising a bracket and a connecting board mounted in the bracket, wherein the bracket is divided into a first receiving room and a second receiving room by the connecting board, the first receiving room is configured to accommodate a first type hard disk module or a second type hard disk module, the second receiving room is configured to accommodate a power supply to execute the function of the accommodated hard disk module;

wherein a first type connector and a second type connector are set on the connecting board, corresponding to the first type hard disk module and the second type hard disk module respectively;

wherein the first type hard disk module comprises a first cage, a first circuit board mounted to a back side of the first cage, and a plurality of first type hard disk devices received in the first cage and electronically connected to an inner side of the first circuit board, a first connector is set on an outer side of the first circuit board and suit for mating with the first type connector; and wherein the second type hard disk module comprises a second cage, a second circuit board mounted to a back side of the second cage, and a plurality of second type hard disk devices received in the second cage and electronically connected to an inner side of the second circuit board, a second connector is set on an outer side of the second circuit board and suit for mating with the second type connector.

2. The assembly of claim 1, wherein the first type hard disk devices are 3.5 inch hard disk devices, and the second type hard disk devices are 2.5 inch hard disk devices.

* * * * *